United States Patent [19]

Stewart

[11] 4,252,614
[45] Feb. 24, 1981

[54] CONTROL OF MULTIPLE FEED FRACTIONAL DISTILLATION COLUMN

[75] Inventor: William S. Stewart, Bartlesville, Okla.

[73] Assignee: Phillips Petroleum Company, Bartlesville, Okla.

[21] Appl. No.: 24,337

[22] Filed: Mar. 27, 1979

[51] Int. Cl.³ .............................................. B01D 3/42
[52] U.S. Cl. .......................................... 203/1; 203/2;
203/3; 203/DIG. 9; 203/DIG. 19; 202/160;
202/186; 202/206; 364/501; 585/800
[58] Field of Search ........................................ 203/1-3,
203/DIG. 9, 87, 99, 98, DIG. 19, DIG. 18;
202/160, 206, 186; 62/21, 37; 208/DIG. 1;
196/132, 141; 585/800; 364/501

[56] References Cited
U.S. PATENT DOCUMENTS

| 3,088,664 | 5/1963 | Oglesby et al. |
| 3,104,810 | 9/1963 | Lupfer |
| 3,175,764 | 3/1965 | Lupfer et al. |
| 3,408,261 | 10/1968 | Johnson et al. ........................ 202/160 |
| 3,411,308 | 11/1968 | Bellinger ................................. 203/1 |
| 3,428,528 | 2/1969 | Oglesby et al. ......................... 203/1 |
| 3,463,725 | 8/1969 | MacFarlane et al. ................. 208/358 |
| 3,475,287 | 10/1969 | DeGraff ................................. 203/99 |
| 3,700,566 | 10/1972 | Bellinger et al. ....................... 203/1 |
| 3,967,937 | 7/1976 | Hobbs ................................... 55/18 |
| 4,070,172 | 1/1978 | Smith et al. ........................... 62/21 |

Primary Examiner—Wilbur L. Bascomb, Jr.

[57] ABSTRACT

A control system for a multiple feed fractional distillation column is disclosed in which the flow rate signals of the multiple feed streams are delayed and combined for use in feedforward predictive control of the upper reflux flow, intermediate reflux flow and/or reboiler fluid flow to the fractional distillation column. Temperature measurements of the upper vapor stream, the upper reflux stream, the intermediate vapor stream and the intermediate reflux stream as well as analysis of a product stream can be utilized to provide feedback control of the fractional distillation column.

48 Claims, 4 Drawing Figures

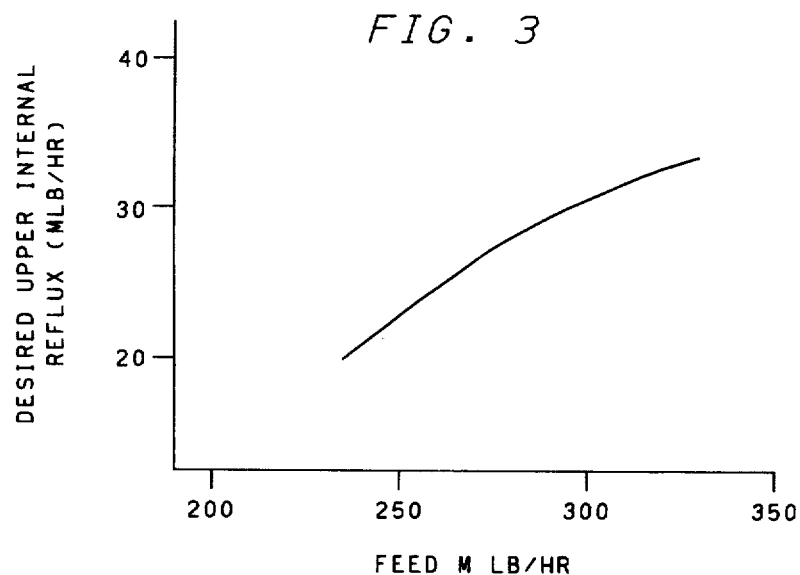
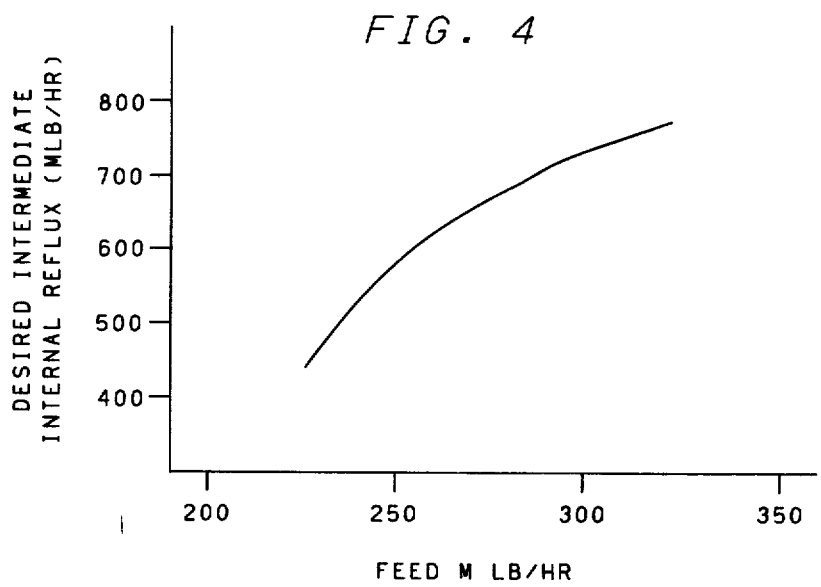

CONTROL OF MULTIPLE FEED FRACTIONAL DISTILLATION COLUMN

This invention relates to method and apparatus for controlling a fractional distillation column. In a particular aspect this invention relates to method and apparatus for controlling a fractional distillation column to which multiple feedstreams are provided. In another particular aspect this invention relates to method and apparatus for providing feedforward control of the upper reflux flow, intermediate reflux flow and/or reboiler fluid flow to a fractional distillation column to which multiple feedstreams are provided. In still another particular aspect this invention relates to method and apparatus for providing a combination of feedforward and feedback control of the upper reflux flow, intermediate reflux flow and/or reboiler fluid flow to a fractional distillation column to which multiple feed streams are provided.

Fractional distillation columns are utilized in a plurality of processes to separate components of a feed stream. Typically, heat is provided to the feed stream in the fractional distillation column and the light components of the feed stream are taken off as an overhead product from the fractional distillation column with the heavier components of the feed stream being taken off as a bottoms product from the fractional distillation column.

Because of the widespread use of fractional distillation columns in different processes, a plurality of different control systems have been developed for fractional distillation columns. It is a common object of most control systems for fractionation columns to be able to optimize the operation of the fractional distillation column so that products with desired specifications can be produced from minimum operating cost. Typically, a control system for a fractional distillation column may center around an analysis of the concentration of a component in either the overhead product or the bottoms product. This concentration is compared to a desired concentration for the component and this comparison is utilized to control the fractional distillation column so as to drive the actual concentration to the desired concentration. The disadvantage to this type of control is that a change in the feed rate to the fractional distillation column will not immediately cause a change in the concentration of a component in either the overhead stream or the bottoms product stream. In large fractionation columns a significant period of time may elapse before a change in the feed rate causes a change in the concentration of a desired component. When the change in the feed rate is finally reflected in the concentration of a desired component, it may take a significant amount of time before the control system for the fractional distillation column can return the concentration of the desired component to its desired level.

Because of this disadvantage to feedback control, it has become increasingly common to utilize predictive feedforward control to control a fractional distillation column with feedback control being utilized to correct the predictive feedforward control as needed. Typically, the flow rate of the feed to the fractional distillation column is utilized for feedforward control. However, it has been extremely difficult in the past to utilize the flow rate of the feed to a fractional distillation column for feedforward control of the fractional distillation column where a plurality of feed streams are provided to the fractional distillation column.

It is thus an object of this invention to provide method and apparatus for controlling a fractional distillation column to which multiple feed streams are provided. It is a particular object of this invention to provide method and apparatus for providing feedforward control of the upper reflux flow, intermediate reflux flow and/or reboiler fluid flow for a fractional distillation column to which multiple feed streams are provided. It is another particular object of this invention to provide method and apparatus for providing a combination of feedforward and feedback control of the upper reflux flow, intermediate reflux flow and/or reboiler fluid flow for a fractional distillation column to which multiple feed streams are provided.

In accordance with the present invention, method and apparatus is provided whereby the flow rates of the plurality of feed streams to a fractional distillation column are measured. The various flow rate signals are delayed to account for the time delay required for the propagation of the feed from each of the plurality of feed streams to either an upper portion or a lower portion of the fractional distillation column. The delayed flow rate signals, which are predictions of overhead and center and bottom flows at a future time, are then combined and provided to load curves which are representative of the relationship between the internal reflux for the fractional distillation column and the feed rate to the fractional distillation column. The internal reflux flow rate as derived from the load curves is utilized to calculate a desired external reflux flow rate using the known equation for computing the external reflux flow rate $$R = R_i/(1 + K\Delta T) \tag{I}$$

where $R$ = the flow rate of the external reflux returning to the fractionation column, $R_i$ = the internal reflux flow rate in the fractional distillation column, $\Delta T$ = the difference between the temperatures of the vapor from the reflux tray and the external reflux returning to the column, and $K$ = the specific heat of the external reflux divided by the heat of vaporization of the external reflux. This equation is developed in "Compouter Control of Distillation Reflux", ISA Journal, June, 1959, pp 34–39 by D. E. Lupfer and D. E. Berger.

The combination of the delayed flow rates is also utilized to provide feedforward control for the flow rate of a heating medium to the reboiler associated with the fractional distillation column. The concentration of components in the bottoms product from the fractional distillation column is utilized to provide feedback control of the flow rate of heating fluid to the reboiler.

The use of both feedforward and feedback control for a fractional distillation column to which multiple feed streams are provided provides a means by which the desired product composition can be obtained while substantially minimizing the energy requirements of the fractional distillation column. This type of fractional distillation control is extremely important in view of the scarcity and cost of energy.

Other objects and advantages of the invention will be apparent from the detailed description of the invention and the appended claims as well as from the detailed description of the drawings in which:

FIG. 3 is a typical plot of the relationship between the feed rate and the internal reflux for the top reflux; and FIG. 4 is a plot of the relationship between the internal reflux and the feed rate for the center external reflux.

Figure 1:
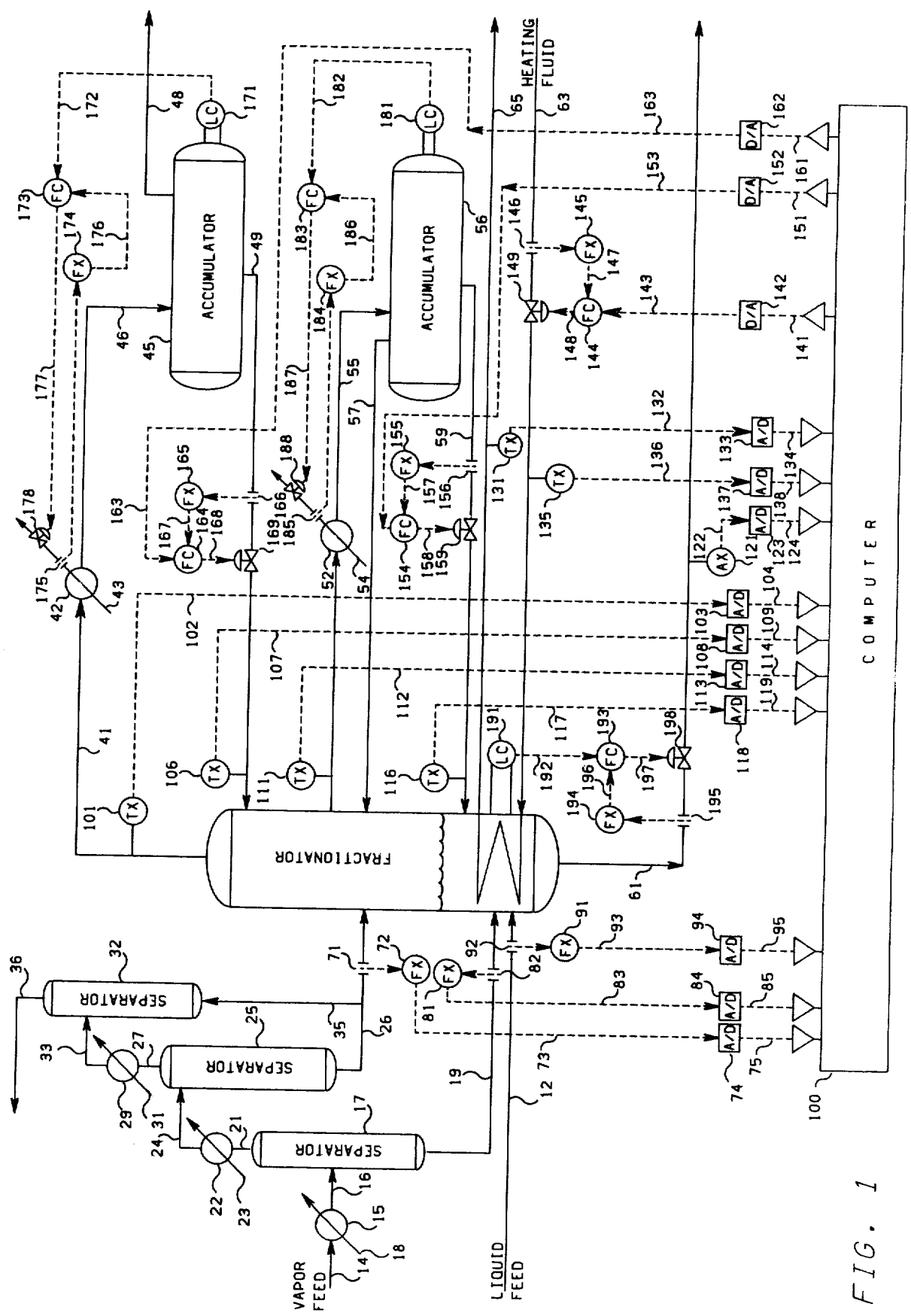
FIG. 1 is an illustration of a fractional distillation column and the associated control system for the fractional distillation column.

The invention is illustrated and described in terms of a demethanizer for an ethylene manufacturing process. The demethanizer column in a modern day ethylene manufacturing process will typically be provided with a plurality of feed streams as inputs to the demethanizer column. The invention, however, is applicable to other fractional distillation columns to which a plurality of feed streams are provided.

The invention is illustrated and described in terms of an integrated control system for a fractional distillation column in which the flow rate of the upper reflux, intermediate reflux and reboiler fluid are all controlled. The invention is, however, applicable to the control of either a single one or any combination of these flows. The invention is also illustrated and described in terms of the control of the bottoms product composition. The invention is, however, applicable to the control of an overhead product or intermediate product composition.

Although the invention is illustrated and described in terms of a specific fractional distillation column and a specific control system for the fractional distillation column, the invention is also applicable to different types and configurations of fractional distillation columns as well as different types of control systems configurations which accomplish the purpose of the invention. Lines designated as signal lines in the drawings are electrical in this preferred embodiment. However, the invention is also applicable to pneumatic, mechanical, hydraulic or other signal means for transmitting information. In almost all control systems some combination of these types of signals will be used. However, use of other types of signal transmission, compatible with the process and equipment in use is within the scope of the invention. A digital computer is used in the preferred embodiment of this invention to calculate the required control signals based on measured process parameters as well as set points supplied to the computer. Analog computers or other types of computing devices could also be used in the invention.

Both the analog and digital controllers shown may utilize the various modes of control such as proportional, proportional-integral, proportional-derivative, or proportional-integral-derivative. In this preferred embodiment, proportional-integral controllers are utilized but any controller capable of accepting two input signals and producing a scaled output signal, representative of a comparison of the two input signals, is within the scope of the invention. The operation of proportional-integral controllers is well known in the art. The output control signal of a proportional-integral controller may be represented as $$S = K_1 E + K_2 \int E dt$$

where

S = output control signals;

E = difference between two input signals; and $K_1$ and $K_2$ = constants.

The scaling of an output signal by a controller is well known in control systems art. Essentially, the output of a controller may be scaled to represent any desired factor or variable. An example of this is where a desired pressure and an actual pressure is compared by a controller. The output could be a signal representative of a desired change in the flow rate of some gas necessary to make the desired and actual pressures equal. On the other hand, the same output signal could be scaled to represent a percentage or could be scaled to represent a temperature change required to make the desired and actual pressures equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more of such equipment types. While the presently preferred embodiment of the invention preferably utilizes a combination of pneumatic control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice meter would ordinarily exhibit a generally proportional relationship to the square of the actual flow. Other measuring instruments might produce a signal which is proportional to the measured parameter, and still other transducing means may produce a signal which bears a more complicated, but known, relationship to the measured parameter. In addition, all signals could be translated into a "suppressed zero" or other similar format in order to provide a "live zero" and prevent an equipment failure from being erroneously interpreted as a "low" or "high" measurement or control signal. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, a fractional distillation column 11, which is a demethanizer column in the preferred embodiment of this invention, is illustrated. The fractional distillation column 11 is provided with a plurality of feed streams from a deethanizer column in the ethylene manufacturing process. A liquid feed stream from the overhead accumulator associated with the deethanizer column is provided through conduit means 12 to the fractional distillation column 11. The liquid feed stream flowing through conduit means 12 will principally contain methane, ethylene and ethane.

A vapor feed stream from the overhead accumulator associated with the deethanizer column in the ethylene manufacturing process is provided through conduit means 14 to the heat exchanger 15. From the heat exchanger 15 the vapor feed flows through conduit means 16 to the separator 17. The vapor feed stream provided through conduit means 14 will also be principally made up of methane, ethylene and ethane. The vapor feed stream will contain a higher concentration of methane and ethylene than the liquid feed stream which will contain a higher concentration of ethane.

A cooling medium is provided to the heat exchanger 15 through conduit means 18. The cooling medium flowing through conduit means 18 is utilized to condense at least a portion of the vapor feed stream flowing through conduit means 14 such that some of the heavier components of the vapor feed stream will be condensed before being supplied to the separator 17. The condensed components of the vapor feed stream are provided through conduit means 19 from the separator 17 to the fractional distillation column 11. The part of the vapor feed stream flowing through conduit means 14 which is still in a vapor form is supplied from the separator 17 through conduit means 21 to the heat exchanger 22. The heat exchanger 22 is provided with a cooling medium flowing through conduit means 23. The cooling medium flowing through conduit means 23 serves to condense at least part of the vapor flowing through conduit means 21. The partially condensed fluid stream is provided from the heat exchanger 22 through the conduit means 24 to the separator 25. From the separator 25 the liquid portion of the fluid stream flowing through conduit means 24 is provided through conduit means 26 to the fractional distillation column 11. The vapor portion of the fluid stream flowing through conduit means 24 is supplied from the separator 25 through conduit means 27 to the heat exchanger 29. A cooling medium is provided to the heat exchanger 29 through conduit means 31. The cooling medium is used to condense at least a portion of the vapor stream flowing through conduit means 27. The partially condensed fluid stream is provided from the heat exchanger 29 to the separator 32 through conduit means 33. The liquid portion of the fluid stream flowing through conduit means 33 is provided from the separator 32 through conduit means 35 which is operably connected to conduit means 26 to the fractional distillation column 11. The portion of the fluid stream flowing through conduit means 33 which remains in vapor form is provided from the separator 32 through conduit means 36 to another portion of the ethylene manufacturing process.

The liquid feed flowing through conduit means 12 will contain the heavier components from the overhead accumulator associated with a deethanizer. These heavier components are provided to a lower portion of the fractional distillation column 11. The feed stream flowing through conduit means 19 will contain a higher percentage of lighter components than that contained in the liquid feed stream flowing through conduit means 12. The percentage of methane will be higher in the feed stream flowing through conduit means 19 than in the feed stream flowing through conduit means 12 which will contain a higher concentration of ethane. The feed stream flowing through conduit means 19 is thus provided to a portion of the fractional distillation column 11 which is above the portion to which the feed stream flowing through conduit means 12 is provided. The feed stream flowing through conduit means 26, which is provided from both the separator 25 and the separator 32, will contain an even higher concentration of methane and a lesser concentration of ethane. The feed stream flowing through conduit means 26 is thus provided to an even higher portion of the fractional distillation column 11 than that to which the feed stream flowing through conduit means 19 is provided.

The fractional distillation column 11, which serves as a demethanizer in an ethylene manufacturing process, separates the methane in the feed streams flowing to the fractional distillation column 11 from the ethane and ethylene in the feed streams. The overhead stream from the fractional distillation column 11, which flows through conduit means 41, will thus be principally methane. The overhead stream flowing through conduit means 41 is provided from the fractional distillation column 11 to the heat exchanger 42. The heat exchanger 42 is provided with a cooling fluid through conduit means 43. The partially condensed fluid stream from the heat exchanger 42 is provided to the accumulator 45 through conduit means 46. The portion of the fluid stream flowing through conduit means 46 which remains in vapor form is withdrawn from the accumulator 45 through conduit means 48 and is provided to another section of the ethylene manufacturing process. The liquid portion of the fluid stream flowing through conduit means 46 is withdrawn from the accumulator 45 and is provided through conduit means 49 as an upper external reflux to the fractional distillation column 11.

A intermediate vapor stream is withdrawn from an intermediate portion of the fractional distillation column 11 through conduit means 51. The intermediate vapor stream will be principally composed of methane but will not have as high a concentration of methane as the overhead product stream flowing through conduit means 41. The intermediate vapor stream is provided from the fractional distillation column 11 through conduit means 51 to the heat exchanger 52. The heat exchanger 52 is provided with a cooling fluid through conduit means 54. The cooling fluid flowing through conduit means 54 is utilized to at least partially condense the vapor stream flowing through conduit means 51 to the heat exchanger 52. The at least partially condensed fluid stream from the heat exchanger 52 is provided through conduit means 55 to the accumulator 56. The vapor portion of the fluid stream flowing through conduit means 55 is returned to distillation column 11 from the accumulator 56 through conduit means 57. The portion of the fluid stream flowing through conduit means 55, which is condensed is provided from the accumulator 56 through conduit means 59 as an intermediate liquid external reflux to the fractional distillation column 11.

The bottoms product stream from the fractional distillation column flows through conduit means 61. The bottoms product from the fractional distillation column 11 will consist primarily of ethylene and ethane. The ethylene and ethane are provided through conduit means 61 to another section of the ethylene manufacturing process.

A heating fluid is provided through conduit means 63 to a reboiler coil in a lower portion of the fractional distillation column 11. This heating fluid is utilized to provide heat to the liquid in the bottom of the fractional distillation column 11 to thereby effect the separation of the methane from the ethane and ethylene. The heating fluid flows out of the fractional distillation column 11 through conduit means 65.

The fractional distillation system described to this point is a conventional fractional distillation system. It is the manner in which the fractional distillation column, illustrated in FIG. 1, is controlled so as to maintain a desired bottoms product composition which provides the novel features of the present invention.

Control of the fractional distillation column 11, illustrated in FIG. 1, is generally accomplished by measuring a plurality of system parameters and supplying the measured parameters to a computer means 100. Computer means 100 is also supplied with a plurality of set point signals, which are representative of desired operating characteristics for the fractional distillation column, illustrated in FIG. 1, as well as operator bias terms. In response to the measured inputs, the set point inputs, and the operator bias terms, computer means 100 calculates the required flow rate for the upper external reflux flowing through conduit means 49, the intermediate liquid external reflux flowing through conduit means 59 and the heating fluid flowing through conduit means 63 required to maintain a desired bottoms product composition flowing through conduit means 61.

The flow transducer 72, in combination with the flow sensor 71, provides an output signal 73 which is representative of the flow rate of the feed stream flowing through conduit means 26. Signal 73 is provided from the flow transducer 72 to the analog-to-digital (A/D) converter 74. Signal 73 is converted from analog form to digital form by the A/D converter 74 and is provided as signal 75 from the A/D converter 74 to computer means 100.

Flow transducer 81, in combination with flow sensor 82, provides an output signal 83 which is representative of the flow rate of the feed stream flowing through conduit means 19. Signal 83 is provided to the A/D converter 84. Signal 83 is converted from analog form to digital form by the A/D converter 84 and is provided as signal 85 to computer means 100.

Flow transducer 91, in combination with flow sensor 92, provides an output signal 93 which is representative of the flow rate of the feed stream flowing through conduit means 12. Signal 93 is provided from flow transducer 91 to the A/D converter 94. Signal 93 is converted from analog form to digital form by the A/D converter 94 and is provided as signal 95 to computer means 100.

The temperature transducer 101, in combination with a temperature measuring device such as a thermocouple which is operably located in conduit means 41, provides an output signal 102 which is representative of the temperature of the overhead stream flowing through conduit means 41. Signal 102 is provided from the temperature transducer 101 to the A/D converter 103. Signal 102 is converted from analog form to digital form by the A/D converter 103 and is provided as signal 104 to computer means 100.

Temperature transducer 106, in combination with a temperature measuring device such as a thermocouple which is operably located in conduit means 49, provides an output signal 107 which is representative of the temperature of the upper external reflux flowing through conduit means 49. Signal 107 is provided from the temperature transducer 106 to the A/D converter 108. Signal 107 is converted from analog form to digital form by the A/D converter 108 and is provided as signal 109 to computer means 100.

Temperature transducer 111, in combination with a temperature measuring device such as a thermocouple which is operably located in conduit means 51, provides an output signal 112 which is representative of the temperature of the intermediate vapor stream flowing through conduit means 51. Signal 112 is provided from the temperature transducer 111 to the A/D converter 113. Signal 112 is converted from analog form to digital form by the A/D converter 113 and is provided as signal 114 to computer means 100.

Temperature transducer 116, in combination with a temperature measuring device such as a thermocouple which is operably located in conduit means 59, provides an output signal 117 which is representative of the temperature of the liquid intermediate reflux flowing through conduit means 59. Signal 117 is provided from the temperature transducer 116 to the A/D converter 118. Signal 117 is converted from analog form to digital form by the A/D converter 118 and is provided as signal 119 to computer means 100.

Analyzer transducer 121, which is operably connected to conduit means 61, is utilized to provide an output signal 122 which is representative of the ratio of methane to ethylene in the bottoms product stream flowing from the fractional distillation column 11 through conduit means 61. In this preferred embodiment, the analyzer transducer 121 is a chromatographic analyzer. Signal 122 is provided from the analyzer transducer 121 to the A/D converter 123. Signal 122 is converted from analog form to digital form by the A/D converter 123 and is provided as signal 124 to computer means 100.

Temperature transducer 131, in combination with a temperature measuring device such as a thermocouple which is operably located in conduit means 65, provides an output signal 132 which is representative of the temperature of the heating fluid flowing from the fractional distillation column 11 through conduit means 65. Signal 132 is provided from the temperature transducer 131 to the A/D converter 133. Signal 132 is converted from analog form to digital form by the A/D converter 133 and is provided as signal 134 to computer means 100.

Temperature transducer 135, in combination with a temperature measuring device such as a thermocouple which is operably located in conduit means 63, provides an output signal 136 which is representative of the temperature of the heating fluid flowing through conduit means 63 to the fractional distillation column 11. Signal 136 is provided from the temperature transducer 135 to the A/D converter 137. Signal 136 is converted from analog form to digital form by the A/D converter 137 and is provided as signal 138 to computer mean 100.

In response to the described inputs, computer means 100 calculates three control signals which are utilized in controlling the fractional distillation process illustrated in FIG. 1. A first signal calculated by computer means 100 is the required flow rate of the heating fluid flowing through conduit means 63 to the fractional distillation column 11. Signal 141 which is representative of the required flow rate of the heating fluid flowing through conduit means 63 to the fractional distillation column 11 is provided as an output from the computer means 100 to the digital-to-analog (D/A) converter 142. Signal 141 is converted from digital form to analog form by the D/A converter 142 and is provided as signal 143 to the flow controller 144. The flow transducer 145, in combination with the flow sensor 146 which is operably located in conduit means 63, provides an output signal 147 which is representative of the actual flow rate of the heating fluid flowing through conduit means 63. Signal 147 is provided from the flow transducer 145 as a second input to the flow controller 144. In response to signals 143 and 147, the flow controller 144 provides an output signal 148 which is responsive to the difference between signals 143 and 147. Signal 148 is provided from the flow controller 144 to the pneumatic control valve 149. Signal 148 is utilized to actuate the pneumatic control valve 149 which is operably located in conduit means 63. The pneumatic control valve 149 is thus manipulated in response to signal 148 to thereby vary the flow rate of the heating fluid flowing through conduit means 63 as necessary to maintain a desired bottoms product composition.

A second output provided from the computer means 100 is signal 151 which is representative of the desired flow rate for the intermediate external reflux flowing through conduit means 59 to the fractional distillation column 11. Signal 151 is provided from computer means 100 to the D/A converter 152. Signal 151 is converted from digital form to analog form and is provided as signal 153 from the D/A converter 152 to the flow controller 154. The flow transducer 155, in combination with the flow sensor 156 which is operably located in conduit means 59, provides an output signal 157 which is representative of the actual flow rate of the intermediate reflux flowing through conduit means 59. Signal 157 is provided from the flow transducer 155 as a second input to the flow controller 154. In response to signals 153 and 157, the flow controller 154 provides an output signal 158 which is responsive to the difference between signals 153 and 157. Signal 158 is provided from the flow controller 154 to the pneumatic control valve 159 which is operably located in conduit means 59. Signal 158 is utilized to actuate the pneumatic control valve 159. The pneumatic control valve 159 is thus manipulated in response to signal 158 to thereby maintain the flow rate of the intermediate external reflux flowing through conduit means 59 at the currently desired level.

The third output signal 161 which is provided from computer means 100 is representative of the desired flow rate of the upper external reflux flowing through conduit means 49 to the fractional distillation column 11. Signal 161 is provided from the computer means 100 to the D/A converter 162. Signal 161 is converted from digital form to analog form by the D/A converter 162 and is provided as signal 163 to the flow controller 164. The flow transducer 165, in combination with the flow sensor 166 which is operably located in conduit means 49, provides an output signal 167 which is representative of the actual flow rate of the upper external reflux flowing through conduit means 49. Signal 167 is provided as a second input to the flow controller 164 from the flow transducer 165. In response to signals 163 and 167, the flow controller 164 provides an output signal 168 responsive to the difference between signals 163 and 167. Signal 168 is provided from the flow controller 164 to the pneumatic control valve 169, which is operably located in conduit means 49, and is utilized to actuate the pneumatic control valve 169. The pneumatic control valve 169 is thus manipulated in response to signal 168 to thereby maintain the flow rate of the upper external reflux flowing through conduit means 49 at the currently desired level.

The liquid level in accumulator 45 is maintained at a desired level by controlling the flow of cooling fluid through conduit means 43. This control is accomplished by using the level controller 171 to provide an output signal 172 which is scaled to be representative of the flow rate of cooling fluid through conduit means 43 required to maintain a desired liquid level in the accumulator 45. Signal 172 is provided from the level controller 171 as a first input to the flow controller 173. The flow transducer 174, in combination with the flow sensor 175 which is operably located in conduit means 43, provides an output signal 176 which is representative of the actual flow rate of cooling fluid through conduit means 43. Signal 76 is provided from the flow transducer 174 as a second input to the flow controller 173. In response to signals 172 and 176, the flow controller 173 provides an output signal 177 which is responsive to the difference between signal 172 and signal 176. Signal 177 is provided from the flow controller 173 to the pneumatic control valve 178 which is operably located in conduit means 43 and is utilized to actuate the pneumatic control valve 178. The pneumatic control valve 178 is thus manipulated in response to signal 177 to thereby vary the flow rate of cooling fluid flowing through conduit means 43 as necessary to maintain a desired liquid level in the accumulator 45.

The liquid level in accumulator 56 is maintained at a desired level by controlling the flow of cooling fluid through conduit means 54. This control is accomplished by using the level controller 181 to provide an output signal 182 which is scaled to be representative of the flow rate of cooling fluid through conduit means 54 required to maintain a desired liquid level in the accumulator 56. Signal 182 is provided from the level controller 181 as a first input to the flow controller 183. The flow transducer 184 in combination with the flow sensor 185, which is operably located in conduit means 54, provides an output signal 186 which is representative of the actual flow rate of cooling fluid through conduit means 54. Signal 186 is provided from the flow transducer 184 as a second input to the flow controller 183. In response to signals 182 and 186, the flow controller 183 provides an output signal 187 which is responsive to the difference between signal 182 and signal 186. Signal 187 is provided from the flow controller 183 to the pneumatic control valve 188 which is operably located in conduit means 54 and is utilized to actuate the pneumatic control valve 188. The pneumatic control valve 188 is thus manipulated in response to signal 187 to thereby vary the flow rate of cooling fluid flowing through conduit means 54 as necessary to maintain a desired liquid level in the accumulator 56.

A desired liquid level in the bottom of the fractional distillation column 11 is maintained by utilizing the level controller 191 to provide an output signal 192 which is scaled so as to be representative of the flow rate of the bottoms product flowing through conduit means 61 which is required to maintain a desired liquid level in the bottom of the fractional distillation column 11. Signal 192 is provided from the level controller 191 as a first input to the flow controller 193. The flow transducer 194, in combination with the flow sensor 195 which is operably located in conduit means 61, provides an output signal 196 which is representative of the actual flow rate of bottoms product through conduit means 61. Signal 196 is provided from the flow transducer 194 as a second input to the flow controller 193. In response to signals 192 and 196, the flow controller 193 provides an output signal 197 which is responsive to the difference between signals 192 and 196. Signal 197 is provided from the flow controller 193 to the pneumatic control valve 198 which is operably located in conduit means 61 and is utilized to actuate the pneumatic control valve 198. The pneumatic control valve 198 is manipulated in response to signal 197 to thereby vary the flow rate of bottoms product through conduit means 61 as necessary to maintain a desired liquid level in the bottom of the fractional distillation column 11.

Figure 2:
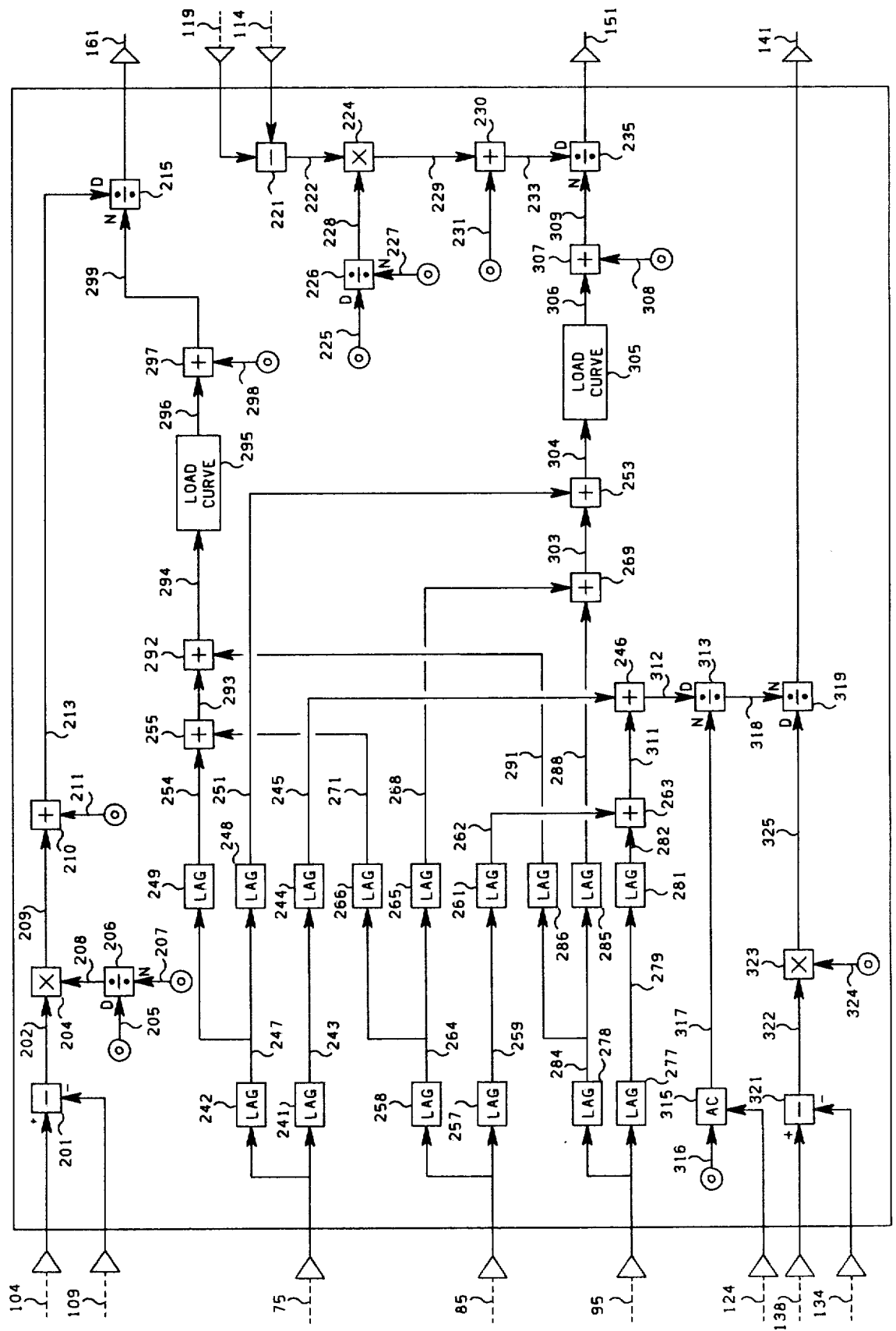
FIG. 2 is a flow diagram of the computer logic required to generate the control signals utilized to control the fractional distillation column illustrated in FIG. 1.

In the computer logic illustrated in FIG. 2, a known equation for computing the required external reflux flow rate is utilized to calculate both the upper external reflux flow rate and the intermediate external reflux flow rate. The required flow rate for the reboiler fluid is calculated by multiplying the specific heat of the heating fluid by the temperature loss of the heating fluid in the fractional distillation column 11. This gives the number of BTUs per pound being given up by the heating fluid in the fractional distillation column 11. Multiplying the number of BTUs per pound being given up by the heating fluid in the fractional distillation column 11 by the number of BTUs per hour required by the fractional distillation column 11 gives the required flow rate of the heating fluid in pounds/hour.

The logic flow diagram utilized to calculate the control signals 141, 151 and 161 in response to the previously described input signals to the computer means 100 is illustrated in FIG. 2. Referring now to FIG. 2, signal 104, which is representative of the temperature of the overhead vapor flowing through conduit means 41 ($V_T$), is provided as a first input to the subtracting block 201. Signal 109, which is representative of the temperature of the upper external reflux flowing through conduit means 49 ($R_T$), is provided as a second input to the subtracting block 201. Signal 109 is subtracted from signal 104 to yield signal 202 which is representative of $V_T$-$R_T$. Signal 202 is provided from the subtracting block 201 as a first input to the multiplying block 204.

Signal 205, which is representative of the heat of vaporization of the upper external reflux fluid flowing through conduit means 49 ($H_{RT}$), is provided as a first input to the dividing block 206. Signal 207, which is representative of the specific heat of the upper external reflux fluid flowing through conduit means 49 ($C_{PT}$), is provided as a second input to the dividing block 206. Signal 207 is divided by signal 205 to provide signal 208 which is representative of $C_{PT}/H_{RT}$. Signal 208 is provided from the dividing block 206 as a second input to the multiplying block 204. Signal 202 is multiplied by signal 208 to provide signal 209 which is representative of ($V_T$-$R_T$) ($C_{PT}/H_{RT}$). Signal 209 is provided from the multiplying block 204 as a first input to the summing block 210. The summing block 210 is also provided with signal 211 which is representative of the constant +1. Signals 209 and 211 are summed to provide signal 213 which is representative of $1+(V_T-R_T)$ ($C_{PT}/H_{RT}$). Signal 213 is provided from the summing block 210 as a first input to the dividing block 215.

Signal 114, which is representative of the temperature of the intermediate vapor flowing through conduit means 51 ($V_c$), is provided as a first input to the subtracting block 221. Signal 119, which is representative of the temperature of the intermediate external reflux flowing through conduit means 59 ($R_c$) is provided as a second input to the subtracting block 221. Signal 119 is subtracted from signal 114 to yield signal 222 which is representative of $V_c$-$R_c$. Signal 222 is provided from the subtracting block 221 as a first input to the multiplying block 224.

Signal 225, which is representative of the heat of vaporization of the intermediate external reflux fluid flowing through conduit means 59 ($H_{Rc}$), is provided as a first input to the dividing block 226. Signal 227, which is representative of the specific heat of the intermediate external reflux fluid flowing through conduit means 59 ($C_{Pc}$), is provided as a second input to the dividing block 226. Signal 227 is divided by signal 225 to provide signal 228 which is representative of $C_{Pc}/H_{Rc}$. Signal 228 is provided from the dividing block 226 as a second input to the multiplying block 224. Signal 222 is multiplied by signal 228 to provide signal 229 which is representative of ($V_c$-$R_c$) ($C_{Pc}/H_{Rc}$). Signal 229 is provided from the multiplying block 224 as a first input to the summing block 230. The summing block 230 is also provided with signal 231 which is representative of the constant +1. Signals 229 and 231 are summed to provide signal 233 which is representative of $1+(V_c-R_c)$ ($C_{Pc}/H_{Rc}$). Signal 233 is provided from the summing block 230 as a first input to the dividing block 235.

The plurality of lag blocks illustrated in FIG. 2 are provided to account for the time delay required for the propagation of compounds of the feed from either conduit means 26, conduit means 19 or conduit means 12, illustrated in FIG. 1, to either the top, center or bottom of the fractional distillation column 11. The output signals from the lag blocks will thus be representative of the flow rate of the feed delayed by the actions of one or several time constants and/or dead times as required for the fractional distillation column 11. The various propagation delays through the fractional distillation column 11 are usually reasonably well known at least to the extent that the propagation delays can be estimated with reasonable accuracy. The propagation delays can also be calculated based on capacity of the trays in the fractional distillation column 11 and the physical dimensions of the fractional distillation column 11 to determine when a change in flow rate at the feed inlets will hit the bottom, center or top of the fractional distillation column 11.

Signal 75, which is representative of the flow rate of the feed stream flowing through conduit means 26, is provided as an input to the lag block 241 and as an input to the lag block 242. The output of the lag block 241 is provided as signal 243 to the lag block 244. Lag blocks 241 and 244 represent a double lag or double delay. The output signal 245 from the lag block 244 will be representative of the flow rate of the feed stream flowing through conduit means 26 delayed by the time which is required for a change in the flow rate of the feed stream flowing through conduit means 26 to be reflected by a change in the flow rate of the bottoms product flowing through conduit means 61. Signal 245 is provided from the lag block 244 as a first input to the summing block 246.

The output signal 247 from the lag block 242 is provided as an input to the lag block 248 and as an input to the lag block 249. The output signal 251 from the lag block 248 will be representative of the flow rate of the feed stream flowing through conduit means 26 delayed by the time required for a change in the flow rate of the feed stream flowing through conduit means 26 to cause a corresponding change in the flow rate of the intermediate vapor stream flowing through conduit means 51. Signal 251 is provided from the lag block 248 as a first input to the summing block 253.

The output signal 254 from the lag block 249 will be representative of the flow rate of the feed stream flowing through conduit means 26 delayed by the time required for a change in the flow rate of the feed stream flowing through conduit means 26 to cause a change in the flow rate of the overhead vapor stream flowing through conduit means 41. Signal 254 is provided from the lag block 249 as a first input to the summing block 255.

Signal 85, which is representative of the flow rate of the feed stream flowing through conduit means 19, is provided as an input to the lag block 257 and as an input to the lag block 258. The output signal 259 from the lag block 258 is provided as an input to the lag block 261. The output signal 262 from the lag block 261 will be representative of the flow rate of the feed stream flowing through conduit means 19 delayed by the time required for a change in the flow rate of the feed stream flowing through conduit means 19 to cause a change in the flow rate of the bottoms product through conduit means 61. Signal 262 is provided from the lag block 261 as a first input to the summing block 263.

The output signal 264 from the lag block 258 is provided as an input to the lag block 265 and as an input to the lag block 266. The output signal 268 from the lag block 265 is representative of the flow rate of the feed stream flowing through conduit means 19 delayed by the time required for a change in the flow rate of the feed stream flowing through conduit means 19 to cause a change in the flow rate of the intermediate vapor stream flowing through conduit means 51. Signal 268 is provided from the lag block 265 as a first input to the summing block 269.

The output signal 271 from the lag block 266 is representative of the flow rate of the feed stream flowing through conduit means 19 delayed by the time required for a change in the flow rate of the feed stream flowing through conduit means 19 to cause a change in the flow rate of the overhead vapor stream flowing through conduit means 41. Signal 271 is provided from the lag block 266 as a second input to the summing block 255.

Signal 95, which is representative of the flow rate of the feed stream flowing through conduit means 12, is provided as an input to the lag block 277 and as an input to the lag block 278. The output signal 279 from the lag block 277 is provided as an input to the lag block 281. The output signal 282 from the lag block 281 will be representative of the flow rate of the feed stream flowing through conduit means 12 delayed by the time required for a change in the flow rate of the feed stream flowing through conduit means 12 to cause a change in the flow rate of the bottoms product through conduit means 61. Signal 282 is provided from the lag block 281 as a second input to the summing block 263.

The output signal 284 from the lag block 278 is provided as an input to the lag block 285 and as an input to the lag block 286. The output signal 288 from the lag block 285 is representative of the flow rate of the feed stream flowing through conduit means 12 delayed by the time required for a change in the flow rate of the feed stream flowing through conduit means 12 to cause a change in the internal flow rates of the distillation column at the conduit 51 location. Signal 288 is provided from the lag block 285 as a second input to the summing block 269.

The output signal 291 from the lag block 286 is representative of the flow rate of the feed stream flowing through conduit means 12 delayed by the time required for a change in the flow rate of the feed stream flowing through conduit means 12 to cause a change in the flow rate of the overhead vapor stream flowing through conduit means 41. Signal 291 is provided from the lag block 285 as a second input to the summing block 292.

Signals 254 and 271 are summed in the summing block 255 to provide signal 293 which is representative of the summation of the flow rates of the feed streams through conduit means 26 and conduit means 19 with both of the flow rates being delayed as required to compensate for propagation delays to the top of the fractional distillation column 11. Signal 293 is provided from the summing block 295 as a second input to the summing block 292. Signals 291 and 293 are summed in the summing block 292 to provide signal 294 which is representative of the feed rates of all of the feed streams flowing into the fractional distillation column 11 with each of the feed rates being delayed by the time required for a change in a respective feed rate to cause a change in the flow rate of the overhead vapor flowing through conduit means 41. Signal 294 is provided from the summing block 292 as an input to the load curve 295.

A typical load curve which can be used in calculating the required flow rate for the top external reflux to the fractional distillation column 11 is illustrated in FIG. 3. The load curve illustrated in FIG. 3 corresponds to load curve 295 illustrated in FIG. 2. As is illustrated in FIG. 3, the load curve is a plot of the desired internal reflux flow rate at the upper portion of the fractional distillation column 11 as a function of the feed rate to the fractional distillation column 11 where the feed rate is delayed as required to account for propagation delays through the fractional distillation column 11. The output signal 296 from the load curve 295 is thus representative of the desired upper internal reflux flow rate in the fractional distillation column 11. Signal 296 is provided from the load curve 295 as a first input to the summing block 297. The summing block 297 is also provided with signal 298 as an input. Signal 298 is representative of a bias term which can be supplied by an operator. If the operator desires to increase or decrease the flow rate of the external reflux flowing through conduit means 49, this can be done simply by changing the bias term represented by signal 298. If no bias is present then signal 296 is simply provided as signal 299 from the summing block 297 as a second input to the dividing block 215. Signal 299 is divided by signal 213 in the dividing block 215 to provide signal 161 which is representative of the flow rate of the top external reflux fluid flowing through conduit means 49 required to maintain the desired upper internal reflux flow rate.

Signals 288 and 268 are summed in the summing block 269 to provide signal 303 which is representative of the summation of the flow rates of the feed streams through conduit means 12 and conduit means 19 with both of the flow rates being delayed as required to compensate for propagation delays to the intermediate of the fractional distillation column 11. Signal 303 is provided from the summing block 269 as a second input to the summing block 253. Signals 251 and 303 are summed in the summing block 253 to provide signal 304 which is representative of the feed rates of all of the feed streams flowing into the fractional distillation column 11 with each of the feed rates being delayed by the time required for a change in a respective feed rate to cause a change in the internal flow rates in the intermediate section of the distillation column. Signal 304 is provided from the summing block 253 as an input to the load curve 305.

A typical load curve which can be used in calculating the required flow rate for the intermediate external reflux to the fractional distillation column 11 is illustrated in FIG. 4. The load curve illustrated in FIG. 4 corresponds to load curve 305 illustrated in FIG. 2. As is illustrated in FIG. 4, the load curve is a plot of the desired internal reflux flow rate at the intermediate portion of the fractional distillation column 11 as a function of the feed rate to the fractional distillation column 11 where the feed rate is delayed as required to account for propagation delays through the fractional distillation column 11. The output signal 306 from the load curve 305 is thus representative of the desired intermediate internal reflux flow rate in the fractional distillation column 11. Signal 306 is provided from the load curve 305 as a first input to the summing block 307. The summing block 307 is also provided with signal 308 as an input. Signal 308 is representative of a bias term which can be supplied by an operator. If the operator desires to increase or decrease the flow rate of the external reflux flowing through conduit means 59, this can be done simply by changing the bias term represented by signal 308. If no bias is present then signal 306 is simply provided as signal 309 from the summing block 307 as a second input to the dividing block 235. Signal 309 is divided by signal 233 in the dividing block 235 to provide signal 151 which is representative of the flow rate of the intermediate external reflux fluid flowing through conduit means 59 required to maintain the desired upper internal reflux flow rate.

Signals 282 and 262 are summed in the summing block 263 to provide signal 311 which is representative of the summation of the flow rates of the feed streams through conduit means 12 and conduit means 19 with both of the flow rates being delayed as required to compensate for propagation delays to the bottom of the fractional distillation column 11. Signal 311 is provided from the summing block 263 as a second input to the summing block 246. Signals 245 and 311 are summed in the summing block 246 to provide signal 312 which is representative of the feed rates of all of the feed streams flowing into the fractional distillation column 11 with each of the feed rates being delayed by the time required for a change in a respective feed rate to cause a change in the flow rate of the bottom product flowing through conduit means 61. Signal 312 is provided from the summing block 246 as a first input to the dividing block 313.

Signal 124, which is representative of the ratio of methane to ethylene in the bottoms product flowing through conduit means 61, is provided as a first input to the analyzer controller block 315. The analyzer controller block 315 is a digital implementation of proportional-integral controller. The analyzer controller block 315 is also provided with a set point signal 316 which is representative of the desired ratio of methane to ethylene in the bottoms product flowing through conduit means 61. In response to signals 124 and 316, the analyzer controller block 315 provides an output signal 317 which is responsive to the difference between signals 124 and 316. Signal 317 is scaled so as to be representative of the number of BTUs which must be supplied for each pound of feed which is supplied to the fractional distillation column 11. Signal 317 is provided from the analyzer controller 315 as a second input to the dividing block 313. Signal 312 has the units pounds/hour while signal 317 has the units BTUs/pound. Signal 317 is divided by signal 312 to provide signal 318 which will have the units BTUs/hour and will be representative of the number of BTUs which must be provided each hour to the fractional distillation column 11 from the heating fluid flowing through conduit means 63. Signal 318 is provided from the dividing block 313 as a first input to the dividing block 319.

Signal 138, which is representative of the temperature of the heating fluid flowing through conduit means 63 ($T_{Ri}$), is provided as a first input to the subtracting block 321. Signal 134, which is representative of the temperature of the heating fluid flowing through conduit means 65 ($T_{Ro}$), is provided as a second input input to the subtracting block 321. Signal 134 is subtracted from signal 138 to provide signal 322 which is representative of $T_{Ri}$-$T_{Ro}$. Signal 322 is provided from the subtracting block 321 as a first input to the multiplying block 323. The multiplying block 323 is also provided with signal 324 which is representative of the specific heat of the heating fluid flowing through conduit means 63. Signal 322 has the units °F. while signal 324 has the units BTU/lbs. °F. Signal 324 is multiplied by signal 322 to provide signal 325 which has the units BTU/lb. and is representative of the number of BTUs which are being given up by each pound of heating fluid in the fractional distillation column 11. Signal 325 is provided as a second input to the dividing block 319 from the multiplying block 323. Signal 318 is divided by signal 325 to provide signal 141 which has the units lbs/hour and is representative of the required flow rate of the heating fluid flowing through conduit means 63. Signal 141 is provided from the dividing block 319 as an output from computer means 100 as has been previously described.

If it is desired to control the composition of a product stream other than the bottom product stream, it is simply necessary to move the analyzer transducer 121 to the product stream which is to be controlled. For example, the analyzer transducer 121 could be utilized to analyze the composition of the overhead product flowing through conduit means 48. The heat input to the fractional distillation column 11 could then be manipulated to maintain a desired overhead product composition. This technique could also be utilized for an intermediate product stream if desired.

The control system illustrated in FIGS. 1 and 2 provides predictive feedforward control for the fractional distillation column 11 by use of the plurality of lag blocks illustrated in FIG. 2. Feedback control for the fractional distillation column is provided by the use of the analyzer 121. The combination of feedforward and feedback control provides a means by which the desired product composition can be maintained over a long period of time with minimal variations while substantially minimizing the energy requirements of the fractional distillation column 11.

The invention has been described in terms of a preferred embodiment as illustrated in FIGS. 1 and 2. Specific components used in the practice of the invention as illustrated in FIG. 1 such as flow sensors 71, 82, 92, 175, 166, 185, 156, 146 and 195; flow transducers 72, 81, 91, 174, 165, 184, 155, 145 and 194; temperature transducers 101, 106, 111, 116, 131, and 135; level controllers 171, 181 and 191; flow controllers 173, 164, 183, 154, 144 and 193; pneumatic control values 198, 149, 159, 188, 169 and 178 are each well known, commercially available control components such as are described at length in Perry's Chemical Engineers' Handbook, 4th Edition, Chapter 22, McGraw-Hill. Other components not previously specified are as follows:

A/D Converters 74, 84, 94, 113, 113, 108, 103, 123, 137 and 133
Digital-to-analog Converters 142,
Analyzer Transducer 121
Computer Means 100
MM5357 8-Bit A/D Converter, National Semiconductor
AD559 8-Bit D/A Converter, Analog Devices
Optichrome 2100, Applied Automation, Inc.
Optrol 3600, Applied Automation, Inc.

For reasons of brevity, conventional auxiliary fractionation equipment such as pumps, heat exchangers, additional measurement-control devices, etc., have not been included in the above description as they play no part in the explanation of the invention.

While the invention has been described in terms of the presently preferred embodiments, reasonable variations and modifications are possible by those skilled in the art within the scope of the described invention and the appended claims. Variations such as using an analog computer to perform the required calculations is within the scope of the invention.

That which is claimed is:

1. Apparatus comprising:
   a fractional distillation column means;
   a plurality of first conduit means for passing a plurality of feed streams into said fractional distillation column means at different heights on said fractional distillation column means;
   second conduit means for passing a heating fluid to said fractional distillation column means to thereby effect the separation of at least a portion of the light components in said feed streams from at least a portion of the heavy components in said feed streams;
   third conduit means for withdrawing said heating fluid from said fractional distillation column means;
   fourth conduit means for withdrawing a product stream from said fractional distillation column means;
   means for establishing a plurality of first signals which are representative of the flow rate of respective ones of said plurality of feed streams into said fractional distillation column means;
   a plurality of first delay means;
   means for providing respective ones of said plurality of first signals to respective ones of said plurality of first delay means to thereby produce a plurality of second signals which are respectively representative of the flow rate, of a respective one of said plurality of feed streams into said fractional distillation column means, delayed by the period of time necessary for a change in the flow rate, of the respective one of said plurality of feed streams into said fractional distillation column means, to cause a change in the flow rate of said product stream flowing out of said fractional distillation column means;
   means for combining said plurality of second signals to produce a third signal representative of the combination of said plurality of second signals;
   means for establishing a fourth signal representative of the heat which must be supplied to said fractional distillation column means by said heating fluid to maintain a desired composition of said product stream;
   means for combining said third signal and said fourth signal to produce a fifth signal representative of the heat which must be supplied to said fractional distillation column means by said heating fluid per unit of time to maintain said desired composition of said product stream; and
   means for utilizing said fifth signal to manipulate the heat input per unit time to said fractional distillation column means.

2. Apparatus in accordance with claim 1 wherein said product stream is a bottoms product stream which is withdrawn from a lower portion of said fractional distillation column means.

3. Apparatus in accordance with claim 2 wherein said means for establishing said fourth signal comprises:
   means for establishing an eighth signal representative of the composition of said bottoms product;
   means for establishing a ninth signal representative of the desired composition of said bottoms product;
   means for comparing said eighth signal and said ninth signal and for establishing said fourth signal responsive to the difference between said eighth signal and said ninth signal.

4. Apparatus in accordance with claim 2 wherein said means for utilizing said fifth signal to manipulate the heat input per unit time to said fractional distillation column means comprises:
   means for establishing a sixth signal representative of the heat which is being supplied to said fractional distillation column means by said heating fluid per unit volume of said heating fluid;
   means for combining said fifth signal and said sixth signal to produce a seventh signal representative of the flow rate of said heating fluid required to maintain said desired bottoms product composition; and
   means for utilizing said seventh signal to manipulate the flow rate of said heating fluid flowing through said second conduit means to said fractional distillation column means.

5. Apparatus in accordance with claim 3 wherein said means for establishing said sixth signal comprises:
   means for establishing a tenth signal representative of the temperature of the heating fluid flowing through said second conduit means;
   means for establishing an eleventh signal representative of the temperature of the heating fluid flowing through said third conduit means;
   means for subtracting said eleventh signal from said tenth signal to thereby establish a twelfth signal representative of the difference between said tenth signal and said eleventh signal;
   means for establishing a thirteenth signal representative of the specific heat of said heating fluid; and
   means for combining said twelfth signal and said thirteenth signal to establish said sixth signal.

6. Apparatus in accordance with claim 5 wherein said means for combining said plurality of second signals is a summing means, said means for combining said third signal and said fourth signal is a dividing means, said means for combining said fifth signal and said sixth signal is a dividing means, and said means for combining said twelfth signal and said thirteenth signal is a multiplying means.

7. Apparatus in accordance with claim 5 wherein said fractional distillation column means is a demethanizer column means.

8. Apparatus in accordance with claim 7 wherein said plurality of first conduit means consists of three first conduit means, a first one of said three first conduit means being operably connected to an upper portion of said fractional distillation column means, a second one of said first conduit means being operably connected to a central portion of said fractional distillation column means and a third one of said three first conduit means being operably connected to a lower portion of said fractional distillation column means.

9. Apparatus in accordance with claim 8 wherein said feed streams comprise principally methane, ethylene and ethane; the concentration of methane being greatest in the feed stream flowing through said first one of said three first conduit means; the concentration of ethane being greatest in the feed stream flowing through said third one of said three first conduit means.

10. Apparatus in accordance with claim 4 additionally comprising:
first condensing means;
first accumulator means;
fifth conduit means for withdrawing an overhead vapor stream from an upper portion of said fractional distillation column means and for passing said overhead vapor stream through said first condensing means to said first accumulator means;
sixth conduit means for withdrawing at least a portion of the condensate in said first accumulator means and for passing at least a portion of the thus withdrawn condensate into an upper portion of said fractional distillation column means as upper external reflux therefor;
means for establishing an eighth signal representative of the temperature of said overhead vapor stream $(V_T)$;
means for establishing a ninth signal representative of the temperature of said upper external reflux flowing through said sixth conduit means $(R_T)$;
means for subtracting said ninth signal from said eighth signal to thereby establish a tenth signal representative of the difference between said eighth signal and said ninth signal $(V_T\text{-}R_T)$;
means for establishing an eleventh signal representative of the specific heat of said upper external reflux flowing said sixth conduit means divided by the heat of vaporization of said upper external reflux flowing through said sixth conduit means $(C_{PT}/H_{RT})$;
means for multiplying said eleventh signal by said tenth signal to produce a twelfth signal representative of $(V_T\text{-}R_T)(C_{PT}/H_{RT})$;
means for establishing a thirteenth signal representative of the constant $+1$;
means for summing said twelfth and said thirteenth signal to produce a fourteenth signal representative of $1+(V_T\text{-}R_T)(C_{PT}/H_{RT})$;
a plurality of second delay means;
means for providing respective ones of said plurality of first signals to respective ones of said plurality of said second delay means to thereby produce a plurality of fifteenth signals which are respectively representative of the flow rate, of a respective one of said plurality of feed streams into said fractional distillation column means, delayed by the period of time necessary for a change in the flow rate, of a respective one of said plurality of feed streams into said fractional distillation column means, to cause a change in the flow rate of said overhead vapor stream;
means for combining said plurality of fifteenth signals to establish a sixteenth signal representative of the combination of said plurality of fifteenth signals;
means for establishing a seventeenth signal, representative of the desired upper internal reflux flow rate in said fractional distillation column means in response to said sixteenth signal;
means for dividing said fourteenth signal by said seventeenth signal to produce an eighteenth signal representative of the flow rate for said upper external reflux flowing through said sixth conduit means required to maintain said desired internal reflux flow rate; and
means for utilizing said eighteenth signal to manipulate the flow rate of said upper external reflux flowing through said sixth conduit means to said fractional distillation column means.

11. Apparatus in accordance with claim 10 wherein said means for establishing said seventeenth signal in response to said sixteenth signal comprises means for comparing said sixteenth signal to a plot of the desired upper internal reflux for said fractional distillation column means as a function of the total feed flow to said fractional distillation column means to thereby produce said seventeenth signal.

12. Apparatus in accordance with claim 10 additionally comprising:
second condensing means;
second accumulator means;
seventh conduit means for withdrawing an intermediate vapor stream from an intermediate portion of said fractional distillation column means and for passing said intermediate vapor stream through said second condensing means to said second accumulator means;
eighth conduit means for withdrawing at least a portion of the condensate in said second accumulator means and for passing at least a portion of the thus withdrawn condensate into an intermediate portion of said fractional distillation column means as intermediate external reflux therefor;
means for establishing a nineteenth signal representative of the temperature of said intermediate vapor stream $(V_C)$;
means for establishing a twentieth signal representative of the temperature of said intermediate external reflux flowing through said eighth conduit means $R_c$;
means for subtracting said twentieth signal from said nineteenth signal to thereby establish a twenty-first signal representative of $(V_c\text{-}R_c)$;
means for establishing a twenty-second signal representative of the specific heat of said intermediate external reflux flowing through said eighth conduit means divided by the heat of vaporization of said intermediate external reflux flowing through said eighth conduit means $(C_{PC}/H_{RC})$;
means for multiplying said twenty-second signal by said twenty-first signal to produce a twenty-third signal representative of $(V_C\text{-}R_C)(C_{PC}/H_{RC})$;
means for establishing a twenty-fourth signal representative of the constant $+1$;

means for summing said twenty-third and said twenty-fourth signal to produce a twenty-fifth signal representative of $1+(V_C\text{-}R_C)(C_{PC}/H_{RC})$;

a plurality of third delay means;

means for providing respective ones of said plurality of first signals to respective ones of said plurality of said third delay means to thereby produce a plurality of twenty-sixth signals which are respectively representative of the flow rate, of a respective one of said plurality of feed streams into said fractional distillation column means, delayed by the period of time necessary for a change in the flow rate, of a respective one of said plurality of feed streams into said fractional distillation column means, to cause a change in the flow rate of said center vapor stream;

means for combining said plurality of twenty-sixth signals to establish a twenty-seventh signal representative of the combination of said plurality of twenty-sixth signals;

means for establishing a twenty-eighth signal representative of the desired intermediate internal reflux flow rate in said fractional distillation column means in response to said twenty-seventh signal;

means for dividing said twenty-fifth signal by said twenty-eighth signal to produce a twenty-ninth signal representative of the flow rate for said intermediate external reflux flowing through said eighth conduit means required to maintain said desired intermediate internal reflux flow rate; and means for utilizing said twenty-ninth signal to manipulate the flow rate of said intermediate external reflux flowing through said eighth conduit means to said fractional distillation column means.

13. Apparatus in accordance with claim 12 wherein said means for establishing said twenty-eighth signal in response to said twenty-seventh signal comprises means for comparing said twenty-seventh signal to a plot of the desired intermediate internal reflux for said fractional distillation column means as a function of the total feed flow to said fractional distillation column means to thereby produce said twenty-eighth signal.

14. A method for controlling a fractional distillation column to which a plurality of feed streams are provided to different heights on said fractional distillation column comprising the steps of:

establishing a plurality of first signals which are representative of the flow rate of respective ones of said plurality of feed streams into said fractional distillation column;

delaying said plurality of first signals to thereby produce a plurality of second signals which are respectively representative of the flow rate, of a respective one of said plurality of feed streams into said fractional distillation column, delayed by the period of time necessary for a change in the flow rate, of a respective one of said plurality of feed streams into said fractional distillation column, to cause a change in the flow rate of a product stream flowing out of said fractional distillation column;

combining said plurality of second signals to produce a third signal representative of the combination of said plurality of second signals;

establishing a fourth signal representative of the heat which must be supplied to said fractional distillation column to maintain a desired product composition;

combining said third signal and said fourth signal to produce a fifth signal representative of the heat which must be supplied to said fractional distillation column per unit time to maintain said desired product composition; and utilizing said fifth signal to manipulate the heat supplied to said fractional distillation column.

15. A method in accordance with claim 14 wherein a heating fluid is utilized to supply heat to said fractional distillation column.

16. A method in accordance with claim 15 wherein said product stream is a bottoms product stream which is withdrawn from a lower portion of said fractional distillation column.

17. A method in accordance with claim 16 additionally comprising the steps of:

establishing a sixth signal representative of the heat which is being supplied to said fractional distillation column by said heating fluid per unit volume of said heat fluid;

combining said fifth signal and said sixth signal to produce a seventh signal representative of the flow rate of said heating fluid required to maintain a desired bottoms product composition; and utilizing said seventh signal to manipulate flow rate of said heating fluid to said fractional distillation column.

18. A method in accordance with claim 17 wherein said step of establishing said fourth signal comprises:

establishing an eighth signal representative of the composition of said bottoms product;

establishing a ninth signal representative of the desired composition of said bottoms product;

comparing said eighth signal and said ninth signal and establishing said fourth signal responsive to the difference between said eighth signal and said ninth signal.

19. A method in accordance with claim 18 wherein said step of establishing said sixth signal comprises:

establishing a tenth signal representative of the temperature of the heating fluid flowing into said fractional distillation column;

establishing an eleventh signal representative of the temperature of the heating fluid flowing out of said fractional distillation column;

subtracting said eleventh signal from said tenth signal to thereby establish a twelfth signal representative of the difference between said tenth signal and said eleventh signal;

establishing a thirteenth signal representative of the specific heat of said heating fluid; and combining said twelfth signal and said thirteenth signal to establish said sixth signal.

20. A method in accordance with claim 19 wherein said step of combining said plurality of second signals comprises summing said plurality of second signals, said step of combining said third signal and said fourth signal comprises dividing said third signal by said fourth signal, said step of combining said fifth signal and said sixth signal comprises dividing said fifth signal by said sixth signal, and said step of combining said twelfth signal and said thirteenth signal comprises multiplying said twelfth signal and said thirteenth signal.

21. A method in accordance with claim 20 wherein said fractional distillation column is a demethanizer column.

22. A method in accordance with claim 21 wherein said feed streams comprise principally methane, ethylene and ethane; the concentration of methane being greatest in the feed stream flowing to an upper portion of said fractional distillation column; the concentration of ethane being greatest in the feed stream flowing to a lower portion of said fractional distillation column.

23. A method in accordance with claim 14 additionally comprising the steps of:

withdrawing an overhead vapor stream from an upper portion of said fractional distillation column and passing said overhead vapor stream through a first condensing means to a first accumulator means;

withdrawing at least a portion of the condensate in said first accumulator means and passing at least a portion of the thus withdrawn condensate into an upper portion of said fractional distillation column means as upper external reflux therefor;

establishing an eighth signal representative of the temperature of said overhead vapor stream ($V_T$);

establishing a ninth signal representative of the temperature of said upper external reflux ($R_T$);

subtracting said ninth signal from said eighth signal to thereby establish a tenth signal representative of the difference between said eighth signal and said ninth signal ($V_T$-$R_T$);

establishing an eleventh signal representative of the specific heat of said upper external reflux divided by the heat of vaporization of said upper external reflux ($C_{PT}/H_{RT}$);

multiplying said eleventh signal by said tenth signal to produce a twelfth signal representative of ($V_T$-$R_T$) ($C_{PT}/H_{RT}$);

establishing a thirteenth signal representative of the constant +1;

summing said twelfth and said thirteenth signal to produce a fourteenth signal representative of $1+(V_T$-$R_T)$ ($C_{PT}/H_{RT}$);

providing respective ones of said plurality of first signals to respective ones of a plurality of second delay means to thereby produce a plurality of fifteenth signals which are respectively representative of the flow rate, of a respective one of said plurality of feed streams into said fractional distillation column, delayed by the period of time necessary for a change in the flow rate, of a respective one of said plurality of feed streams into said fractional distillation column, to cause a change in the flow rate of said overhead vapor stream;

combining said plurality of fifteenth signals to establish a sixteenth signal representative of the combination of said plurality of fifteenth signals;

establishing a seventeenth signal, representative of the desired upper internal reflux flow rate in said fractional distillation column in response to said sixteenth signal;

dividing said fourteenth signal by said seventeenth signal to produce an eighteenth signal representative of the flow rate for said upper external reflux required to maintain said desired upper internal reflux flow rate; and utilizing said eighteenth signal to manipulate the flow rate of said upper external reflux.

24. A method in accordance with claim 23 wherein said step of establishing said seventeenth signal in response to said sixteenth signal comprises comparing said sixteenth signal to a plot of the desired upper internal reflux for said fractional distillation column as a function of the total feed flow to said fractional distillation column to thereby produce said seventeenth signal.

25. A method in accordance with claim 23 additionally comprising the steps of:

withdrawing an intermediate vapor stream from an intermediate portion of said fractional distillation column and passing said intermediate vapor stream through a second condensing means to a second accumulator means;

withdrawing at least a portion of the condensate in said second accumulator means and passing at least a portion of the thus withdrawn condensate into an intermediate portion of said fractional distillation column as intermediate external reflux therefor;

establishing a nineteenth signal representative of the temperature of said intermediate vapor stream ($V_C$);

establishing a twentieth signal representative of the temperature of said intermediate external reflux $R_C$;

subtracting said twentieth signal from said nineteenth signal to thereby establish a twenty-first signal representative of the difference between said nineteenth signal and said twentieth signal;

establishing a twenty-second signal representative of the specific heat of said intermediate external reflux divided by the heat of vaporization of said intermediate external reflux ($C_{PC}/H_{RC}$);

multiplying said twenty-second signal by said twenty-first signal to produce a twenty-third signal representative of ($V_C$-$R_C$) ($C_{PC}/H_{RC}$);

establishing a twenty-fourth signal representative of the constant +1;

summing said twenty-third and said twenty-fourth signal to produce a twenty-fifth signal representative of $1+(V_C$-$R_C)$ ($C_{PC}/H_{RC}$);

providing respective ones of said plurality of first signals to respective ones of a plurality of third delay means to thereby produce a plurality of twenty-sixth signals which are respectively representative of the flow rate, of a respective one of said plurality of feed streams into said fractional distillation column, delayed by the period of time necessary for a change in the flow rate, of a respective one of said plurality of feed streams into said fractional distillation column, to cause a change in the flow rate of said intermediate vapor stream;

combining said plurality of twenty-sixth signals to establish a twenty-seventh signal representative of the combination of said plurality of twenty-sixth signals;

establishing a twenty-eighth signal representative of the desired intermediate internal reflux flow rate in said fractional distillation column in response to said twenty-seventh signal;

dividing said twenty-fifth signal by said twenty-eighth signal to produce a twenty-ninth signal representative of the flow rate for said intermediate external reflux required to maintain said desired intermediate internal reflux flow rate; and utilizing said twenty-ninth signal to manipulate the flow rate of said intermediate external reflux.

26. A method in accordance with claim 25 wherein said step of establishing said twenty-eighth signal in response to said twenty-seventh signal comprises comparing said twenty-seventh signal to a plot of the desired intermediate internal reflux for said fractional distillation column as a function of the total feed flow to said fractional distillation column to thereby produce said twenty-eighth signal.

27. Apparatus comprising:

a fractional distillation column means;

a plurality of first conduit means for passing a plurality of feed streams into said fractional distillation column means at different heights on said fractional distillation column means;

second conduit means for passing a heating fluid to said fractional distillation column means to thereby effect the separation of at least a portion of the light components in said feed streams from at least a portion of the heavy components in said feed streams;

third conduit means for withdrawing said heating fluid from said fractional distillation column means;

fourth conduit means for withdrawing a product stream from said fractional distillation column means;

condensing means;

accumulator means;

fifth conduit means for withdrawing an overhead vapor stream from an upper portion of said fractional distillation column means and for passing said overhead vapor stream through said condensing means to said accumulator means;

sixth conduit means for withdrawing at least a portion of the condensate in said accumulator means and for passing at least a portion of the thus withdrawn condensate into an upper portion of said fractional distillation column means as upper external reflux therefor;

means for establishing a plurality of first signals which are representative of the flow rate of respective ones of said plurality of feed streams into said fractional distillation column means;

a plurality of delay means;

means for providing respective ones of said plurality of first signals to respective ones of said plurality of delay means to thereby produce a plurality of second signals which are respectively representative of the flow rate, of a respective one of said plurality of feed streams into said fractional distillation column means, delayed by the period of time necessary for a change in the flow rate, of the respective one of said plurality of feed streams into said fractional distillation column means, to cause a change in the flow rate of said overhead vapor stream;

means for combining said plurality of second signals to produce a third signal representative of the combination of said plurality of second signals;

means for establishing a fourth signal representative of the desired upper internal reflux flow rate in said fractional distillation column means in response to said third signal;

means for establishing a fifth signal representative of the flow rate for said upper external reflux flowing through said sixth conduit means, required to maintain said desired upper internal reflux flow rate, in response to said fourth signal; and means for utilizing said fifth signal to manipulate the flow rate of said upper external reflux flowing through said sixth conduit means to said fractional distillation column means.

28. Apparatus in accordance with claim 27 wherein said plurality of first conduit means consists of three first conduit means, a first one of said three first conduit means being operably connected to an upper portion of said fractional distillation column means, a second one of said first conduit means being operably connected to a central portion of said fractional distillation column means and a third one of said three first conduit means being operably connected to a lower portion of said fractional distillation column means.

29. Apparatus in accordance with claim 28 wherein said feed streams comprise principally methane, ethylene and ethane; the concentration of methane being greatest in the feed stream flowing through said first one of said three first conduit means; the concentration of ethane being greatest in the feed stream flowing through said third one of said three first conduit means.

30. Apparatus in accordance with claim 29 wherein said fractional distillation column means is a demethanizer column means.

31. Apparatus in accordance with claim 27 wherein said means for establishing said fourth signal in response to said third signal comprises means for comparing said third signal to a plot of the desired upper internal reflux for said fractional distillation column means as a function of the total feed flow to said fractional distillation column means to thereby produce said fourth signal.

32. Apparatus in accordance with claim 27 wherein said means for establishing said fifth signal comprises:

means for establishing a sixth signal representative of the temperature of said overhead vapor stream ($V_T$);

means for establishing a seventh signal representative of the temperature of said upper external reflux flowing through said sixth conduit means ($R_T$);

means for subtracting said seventh signal from said sixth signal to thereby establish an eighth signal representative of the difference between said sixth signal and said seventh signal ($V_T$-$R_T$);

means for establishing a ninth signal representative of the specific heat of said upper external reflux flowing through said sixth conduit means divided by the heat of vaporization of said upper external reflux flowing through said sixth conduit means ($C_{PT}/H_{RT}$);

means for multiplying said ninth signal by said eighth signal to produce a tenth signal representative of ($V_T$-$R_T$) ($C_{PT}/H_{RT}$);

means for establishing an eleventh signal representative of the constant +1;

means for summing said tenth and said eleventh signal to produce a twelfth signal representative of $1+(V_T$-$R_T)$ ($C_{PT}/H_{RT}$); and means for dividing said twelfth signal by said fourth signal to thereby establish said fifth signal.

33. A method for controlling the flow of the upper external reflux to a fractional distillation column to which a plurality of feed streams are provided to different heights on said fractional distillation column comprising the steps of:

withdrawing an overhead vapor stream from an upper portion of said fractional distillation column and passing said overhead vapor stream through a first condensing means to a first accumulator means;

withdrawing at least a portion of the condensate in said first accumulator means and passing at least a portion of the thus withdrawn condensate into an upper portion of said fractional distillation column means as said upper external reflux therefor;

establishing a plurality of first signals which are representative of the flow rate of respective ones of said plurality of feed streams into said fractional distillation column;

delaying said plurality of first signals to thereby produce a plurality of second signals which are respectively representative of the flow rate, of a respective one of said plurality of feed streams into said fractional distillation column, delayed by the period of time necessary for a change in the flow rate, of a respective one of said plurality of feed streams into said fractional distillation column, to cause a change in the flow rate of the overhead vapor stream flowing out of said fractional distillation column;

combining said plurality of second signals to produce a third signal representative of the combination of said plurality of second signals;

establishing a fourth signal representative of the desired upper internal reflux flow rate in said fractional distillation column means in response to said third signal;

establishing a fifth signal representative of the flow rate for said upper external reflux, required to maintain said desired upper internal reflux flow rate, in response to said fourth signal; and manipulating the flow rate of said upper external reflux in response to said fifth signal.

34. A method in accordance with claim 33 wherein said feed streams comprise principally methane, ethylene and ethane; the concentration of methane being greatest in the feed stream flowing to an upper portion of said fractional distillation column; the concentration of ethane being greatest in the feed stream flowing to a lower portion of said fractional distillation column.

35. A method in accordance with claim 34 wherein said fractional distillation column is a demethanizer column.

36. A method in accordance with claim 33 wherein said step of establishing said fourth signal in response to said third signal comprises comparing said third signal to a plot of the desired upper internal reflux for said fractional distillation column as a function of the total feed flow to said fractional distillation column to thereby produce said fourth signal.

37. A method in accordance with claim 33 wherein said step of establishing said fifth signal comprises:

establishing a sixth signal representative of the temperature of said overhead vapor stream ($V_T$);

establishing a seventh signal representative of the temperature of said upper external reflux ($R_T$);

subtracting said seventh signal from said sixth signal to thereby establish an eighth signal representative of the difference between said sixth signal and said seventh signal ($V_T$-$R_T$);

establishing a ninth signal representative of the specific heat of said upper external reflux divided by the heat of vaporization of said upper external reflux ($C_{PT}/H_{RT}$);

multiplying said ninth signal by said eighth signal to produce a tenth signal representative of ($V_T$-$R_T$)($C_{PT}/H_{RT}$);

establishing an eleventh signal representative of the constant +1;

summing said tenth signal and said eleventh signal to produce a twelfth signal representative of 1+($V_T$-$R_T$) ($C_{PT}/H_{RT}$); and dividing said twelfth signal by said fourth signal to thereby establish said fifth signal.

38. Apparatus comprising:

a fractional distillation column means;

a plurality of first conduit means for passing a plurality of feed streams into said fractional distillation column means at different heights on said fractional distillation column means;

second conduit means for passing a heating fluid to said fractional distillation column means to thereby effect the separation of at least a portion of the light components in said feed streams from at least a portion of the heavy components in said feed streams;

third conduit means for withdrawing said heating fluid from said fractional distillation column means;

fourth conduit means for withdrawing a product stream from said fractional distillation column means;

condensing means;

accumulator means;

fifth conduit means for withdrawing an intermediate vapor stream from an intermediate portion of said fractional distillation column means and for passing said intermediate vapor stream through said condensing means to said accumulator means;

sixth conduit means for withdrawing at least a portion of the condensate in said accumulator means and for passing at least a portion of the thus withdrawn condensate into an intermediate portion of said fractional distillation column means as intermediate external reflux therefor;

means for establishing a plurality of first signals which are representative of the flow rate of respective ones of said plurality of feed streams into said fractional distillation column means;

a plurality of delay means;

means for providing respective ones of said plurality of first signals to respective ones of said plurality of delay means to thereby produce a plurality of second signals which are respectively representative of the flow rate, of a respective one of said plurality of feed streams into said fractional distillation column means, delayed by the period of time necessary for a change in the flow rate, of the respective one of said plurality of feed streams into said fractional distillation column means, to cause a change in the flow rate of said intermediate vapor stream flowing out of said fractional distillation column means;

means for combining said plurality of second signals to produce a third signal representative of the combination of said plurality of second signals;

means for establishing a fourth signal representative of the desired intermediate internal reflux flow rate in said fractional distillation column means in response to said third signal;

means for establishing a fifth signal representative of the flow rate for said intermediate external reflux flowing through said sixth conduit means required to maintain said desired intermediate reflux flow rate, in response to said fourth signal; and means for utilizing said fifth signal to manipulate the flow rate of said intermediate external reflux flowing through said sixth conduit means to said fractional distillation column means.

39. Apparatus in accordance with claim 38 wherein said plurality of first conduit means consists of three first conduit means, a first one of said three first conduit means being operably connected to an upper portion of said fractional distillation column means, a second one of said first conduit means being operably connected to a central portion of said fractional distillation column means and a third one of said three first conduit means being operably connected to a lower portion of said fractional distillation column means.

40. Apparatus in accordance with claim 39 wherein said feed streams comprise principally methane, ethylene and ethane; the concentration of methane being greatest in the feed stream flowing through said first one of said three first conduit means; the concentration of ethane being greatest in the feed stream flowing through said third one of said three first conduit means.

41. Apparatus in accordance with claim 40 wherein said fractional distillation column means is a demethanizer column means.

42. Apparatus in accordance with claim 38 wherein said means for establishing said fourth signal in response to said third signal comprises means for comparing said third signal to a plot of the desired intermediate internal reflux for said fractional distillation column means as a function of the total feed flow to said fractional distillation column means to thereby produce said fourth signal.

43. Apparatus in accordance with claim 38 wherein said means for establishing said fifth signal comprises:
  means for establishing a sixth signal representative of the temperature of said intermediate vapor stream ($V_C$);
  means for establishing a seventh signal representative of the temperature of said intermediate external reflux flowing through said eighth conduit means ($R_c$);
  means for subtracting said seventh signal from said sixth signal to thereby establish an eighth signal representative of ($V_c$-$R_c$);
  means for establishing a ninth signal representative of the specific heat of said intermediate external reflux flowing through said eighth conduit means divided by the heat of vaporization of said intermediate external reflux flowing through said eighth conduit means ($C_{PC}/H_{RC}$);
  means for multiplying said ninth signal by said eighth signal to produce a tenth signal representative of ($V_C$-$R_C$) ($C_{PC}/H_{RC}$);
  means for establishing an eleventh signal representative of the constant +1;
  means for summing said tenth and said eleventh signal to produce a twelfth signal representative of $1+(V_C$-$R_C)$ ($C_{PC}/H_{RC}$); and
  means for dividing said twelfth signal by said fourth signal to thereby establish said fifth signal.

44. A method for controlling the flow of the intermediate external reflux to a fractional distillation column to which a plurality of feed streams are provided to different heights on said fractional distillation column comprising the steps of:
  withdrawing an intermediate vapor stream from an intermediate portion of said fractional distillation column and passing said intermediate vapor stream through a second condensing means to a second accumulator means;
  withdrawing at least a portion of the condensate in said second accumulator means and passing at least a portion of the thus withdrawn condensate into an intermediate portion of said fractional distillation column as intermediate external reflux therefor;
  establishing a plurality of first signals which are representative of the flow rate of respective ones of said plurality of feed streams into said fractional distillation column;
  delaying said plurality of first signals to thereby produce a plurality of second signals which are respectively representative of the flow rate, of a respective one of said plurality of feed streams into said fractional distillation column, delayed by the period of time necessary for a change in the flow rate, of a respective one of said plurality of feed streams into said fractional distillation column, to cause a change in the flow rate of the intermediate vapor stream flowing out of said fractional distilltion column;
  combining said plurality of second signals to produce a third signal representative of the combination of said plurality of second signals;
  establishing a fourth signal representative of the desired intermediate internal reflux flow rate in response to said third signal;
  establishing a fifth signal representative of the flow rate for said intermediate external reflux, required to maintain said desired intermediate internal reflux flow rate, in response to said fourth signal; and
  manipulating the flow rate of said intermediate external reflux in response to said fifth signal.

45. A method in accordance with claim 44 wherein said feed streams comprise principally methane, ethylene and ethane; the concentration of methane being greatest in the feed stream flowing to an upper portion of said fractional distillation column; the concentration of ethane being greatest in the feed stream flowing to a lower portion of said fractional distillation column.

46. A method in accordance with claim 45 wherein said fractional distillation column is a demethanizer column.

47. A method in accordance with claim 44 wherein aid step of establishing said fourth signal in response to said third signal comprises comparing said third signal to a plot of the desired intermediate internal reflux for said fractional distillation column as a function of the total feed flow to said fractional distillation column to thereby produce said fourth signal.

48. A method in accordance with claim 44 wherein said step of establishing said fifth signal comprises:
  establishing a sixth signal representative of the temperature of said intermediate vapor stream ($V_C$);
  establishing a seventh signal representative of the temperature of said intermediate external reflux ($R_c$);
  subtracting said seventh signal from said sixth signal to thereby establish an eighth signal representative of the difference between said sixth signal and said seventh signal;
  establishing a ninth signal representative of the specific heat of said intermediate external reflux divided by the heat of vaporization of said intermediate external reflux ($C_{PC}/H_{RC}$);
  multiplying said ninth signal by said eighth signal to produce a tenth signal representative of ($V_C$-$R_C$) ($C_{PC}/H_{RC}$);
  establishing an eleventh signal representative of the constant +1;
  summing said tenth signal and said eleventh signal to produce a twelfth signal representative of $1+(V_C$-$R_C)$ ($C_{PC}/H_{RC}$); and
  dividing said twelfth signal by said fourth signal to thereby establish said fifth signal.

* * * * *